United States Patent
Chen

(10) Patent No.: US 7,213,982 B2
(45) Date of Patent: May 8, 2007

(54) OPTOELECTRONIC MODULE WITH HIGH COUPLING EFFICIENCY

(75) Inventor: Ye Chen, San Jose, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 10/960,125

(22) Filed: Oct. 7, 2004

(65) Prior Publication Data

US 2006/0078262 A1  Apr. 13, 2006

(51) Int. Cl.
G02B 6/36 (2006.01)
G02B 6/32 (2006.01)
(52) U.S. Cl. .......................... 385/93; 385/35
(58) Field of Classification Search ............... 385/14, 385/33–35, 49, 52, 88–94; 257/432
See application file for complete search history.

(56) References Cited

U.S. PATENT DOCUMENTS

| | | | |
|---|---|---|---|
| 4,767,171 A | | 8/1988 | Keil et al. |
| 6,519,099 B1 * | | 2/2003 | Blair et al. ............. 359/819 |
| 6,620,154 B1 * | | 9/2003 | Amirkhanian et al. ....... 606/17 |
| 2003/0206703 A1 | | 11/2003 | Chiu et al. |
| 2004/0091268 A1 | | 5/2004 | Hogan et al. |
| 2004/0101020 A1 | | 5/2004 | Bhandarkar |
| 2005/0069261 A1 * | | 3/2005 | Arayama ..................... 385/52 |
| 2006/0072883 A1 * | | 4/2006 | Kilian et al. ................. 385/93 |

FOREIGN PATENT DOCUMENTS

| | | |
|---|---|---|
| DE | 19510559 C1 | 7/1996 |
| DE | 19618149 A1 | 11/1997 |
| EP | 0238977 | 9/1987 |
| WO | WO96/29622 | 3/1995 |

OTHER PUBLICATIONS

NASA Technical Memorandum 4578, Numerical Aperature Limits on Efficient Ball Lens Coupling of Laser Diodes to Single-Mode Fibers with Defocus to Balance Spherical Aberration, (Nov. 1994).

* cited by examiner

Primary Examiner—Sarah Song

(57) ABSTRACT

An optoelectronic module includes a laser, a ball lens, a substrate, a reflector, and a focusing lens. The laser generates a diverging light beam along an optical axis. The ball lens has a center. The substrate has a surface supporting the laser and an alignment structure. The alignment structure registers the ball lens in a plane parallel to the substrate surface and in a direction normal to the substrate surface so that the center of the ball lens is substantially aligned with the optical axis and the ball lens parallelizes the diverging light beam into a collimated beam. The reflector deflects the collimated beam to produce a deflected collimated beam in a plane intersecting the substrate surface. The focusing lens focuses the deflected collimated beam.

20 Claims, 4 Drawing Sheets

OPTOELECTRONIC MODULE WITH HIGH COUPLING EFFICIENCY

BACKGROUND

Optoelectronic modules have been developed for transmitting optical information or receiving optical information or both. An optoelectronic module typically includes at least one active device, such as an optical receiver or an optical transmitter, and a lens for coupling light between the active device and an optical fiber of a fiber optic cable. An optoelectronic module typically includes a connector with a bore that is configured to receive a ferrule, which holds an optical fiber of the fiber optic cable. The bore positions an end of the optical fiber at the focal point of the lens of the optoelectronic module.

During fabrication of an optoelectronic module, the optical components are aligned with one another and with an optical fiber of a fiber optic cable to optimize the coupling efficiency between the active device and the optical fiber. In one active alignment approach, the connector holding the ferrule is mechanically manipulated until an optimal coupling between the optical fiber held by the ferrule and the active device within the optoelectronic module is achieved. After the optimal coupling has been achieved, the connector is bonded to the optoelectronic module. This process requires either human interaction or expensive equipment that automatically dithers the connector into the optimal position.

Some types of optoelectronic modules use machined parts to align the active devices and the coupling optics. The alignment accuracies of such machined parts are low. In order to compensate for the large accumulated alignment mismatches inherent in such designs, the connector typically is actively aligned to the focusing lens in three dimensions to achieve a high coupling efficiency with the optical fiber. Active alignment in three dimensions, however, increases the cost and complexity of the optical alignment process.

Planar wafer-level optical assemblies have been developed for coupling light between an external fiber optic cable and the active components of optoelectronic modules. These optical assemblies simplify the tasks of packaging the active devices and aligning the coupling optics to the external fiber optic cable. The coupling optics in the transmitter optical paths of these designs include a single lens for focusing a diverging light beam from a laser onto the receiving end of an optical fiber. The use of such a focusing lens imposes significant constraints on the design of the optical components along the transmitter optical path between the laser and the focusing lens. In addition, in designs that use a single ball lens to focus light from a laser onto an external optical fiber, the ball lens introduces significant aberrations that reduce the coupling efficiency between the laser and the external optical fiber.

SUMMARY

The invention features an optoelectronic module, an optoelectronic method, and a method of making an optoelectronic module.

In one aspect, the invention features an optoelectronic module that includes a laser, a ball lens, a substrate, a reflector, and a focusing lens. The laser is operable to generate a diverging light beam along an optical axis. The ball lens has a center. The substrate has a surface supporting the laser and an alignment structure. The alignment structure registers the ball lens in a plane parallel to the substrate surface and in a direction normal to the substrate surface so that the center of the ball lens is substantially aligned with the optical axis and the ball lens parallelizes the diverging light beam into a collimated beam. The reflector is arranged to deflect the collimated beam to produce a deflected collimated beam in a plane intersecting the substrate surface. The focusing lens is arranged to focus the deflected collimated beam.

In another aspect of the invention, a diverging light beam is generated along an optical axis. The diverging light beam is parallelized into a collimated beam. The collimated beam is deflected along a deflected beam path. The deflected collimated beam is focused.

The invention also features a method of making the above-described optoelectronic module.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The optoelectronic modules described in detail below include a laser subassembly that has an alignment structure for aligning a laser and a collimating ball lens with high accuracy. A separate focusing lens couples the collimated beam from the laser subassembly to an external optical fiber. The high alignment accuracy between the laser and the collimating ball lens relaxes the alignment tolerances between the collimated laser light and the focusing lens that are needed to achieve high coupling efficiency with an external optical fiber. In addition, collimating the laser light in the laser subassembly increases the flexibility with which the coupling optics subassembly of these optoelectronic modules may be designed. For example, in some implementations, the laser subassembly and the coupling optics subassembly may be designed and optimized as separate modular components, whereby a single laser subassembly design may be combined with different coupling optics subassemblies to meet different application needs.

Figure 1:
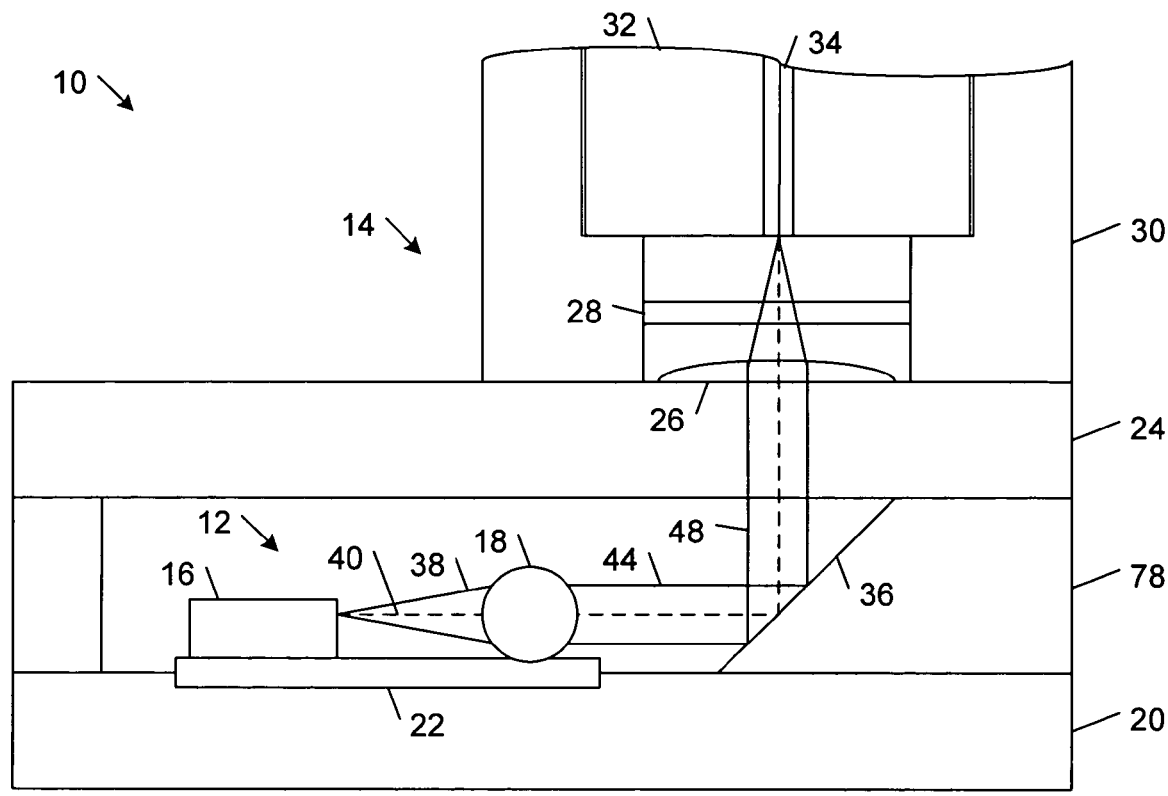
FIG. 1 is a block diagram of an embodiment of an optoelectronic module.

FIG. 1 shows an embodiment of an optoelectronic module 10 that includes a laser subassembly 12 and a coupling optics subassembly 14. The laser subassembly 12 includes a laser 16, a ball lens 18, and a substrate 20. The substrate 20 has a surface supporting the laser 16 and an alignment structure 22 that registers the ball lens 18 in alignment with the optical axis 40 of the light beam 38 generated by the laser 16. The coupling optics subassembly 14 includes an optical substrate 24, a focusing lens 26, an optical isolator 28, and a fiber optic connector 30. The fiber optic connector 30 is configured to receive a ferrule 32 that holds the receiving end of an optical fiber 34. A reflector 36 couples the laser light from the laser subassembly 12 to the focusing lens 26 of the coupling optics subassembly 14.

Figure 2:
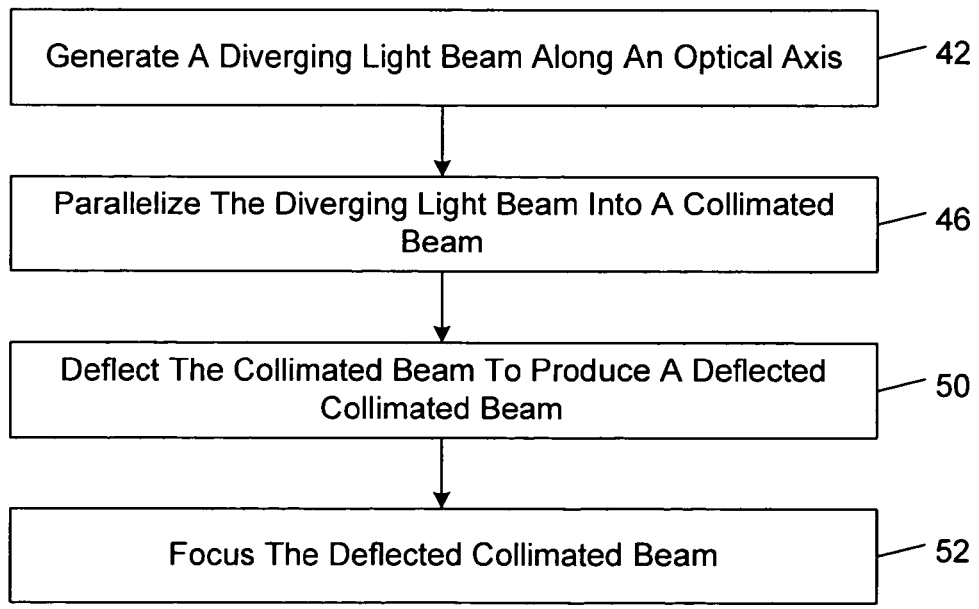
FIG. 2 is a flow diagram of an embodiment of an optoelectronic method.

FIG. 2 shows an embodiment of a method by which the optoelectronic module 10 couples light from the laser 16 into the receiving end of the optical fiber 34. The laser 16 generates a diverging light beam 38 along an optical axis 40 (block 42). The ball lens 18 parallelizes the diverging light beam 38 into a collimated beam 44 (block 46). The reflector 36 deflects the collimated beam 44 to produce a deflected collimated beam 48 (block 50). The focusing lens 26 focuses the deflected collimated beam 48 onto the receiving end of the optical fiber 34 (block 52).

Figure 3:
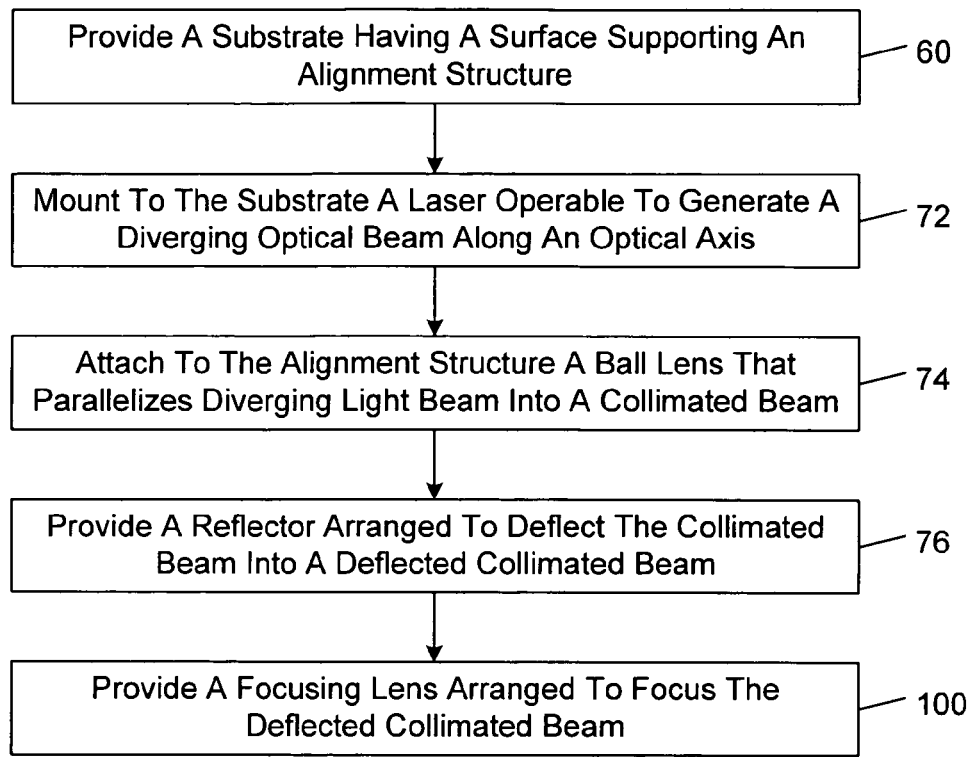
FIG. 3 is a flow diagram of an embodiment of a method of making the optoelectronic module shown in FIG. 1.

FIG. 3 shows an embodiment of a method of making the optoelectronic module 10.

The laser subassembly 12 is fabricated as follows. Initially, the substrate 20 having a surface supporting the alignment structure 22 is provided (block 60). In general, the substrate 20 may be formed of any type of material on which the alignment structure 22 may be formed, including a semiconductor material (e.g., silicon), a ceramic material, and certain plastic materials (e.g., PTFE). The alignment structure 22 includes one or more registration features that are sized arranged with high precision. In some implementations, the registration features are sized and arranged using photolithographic processes with a precision of ±5 micrometers (µm).

Figure 4:
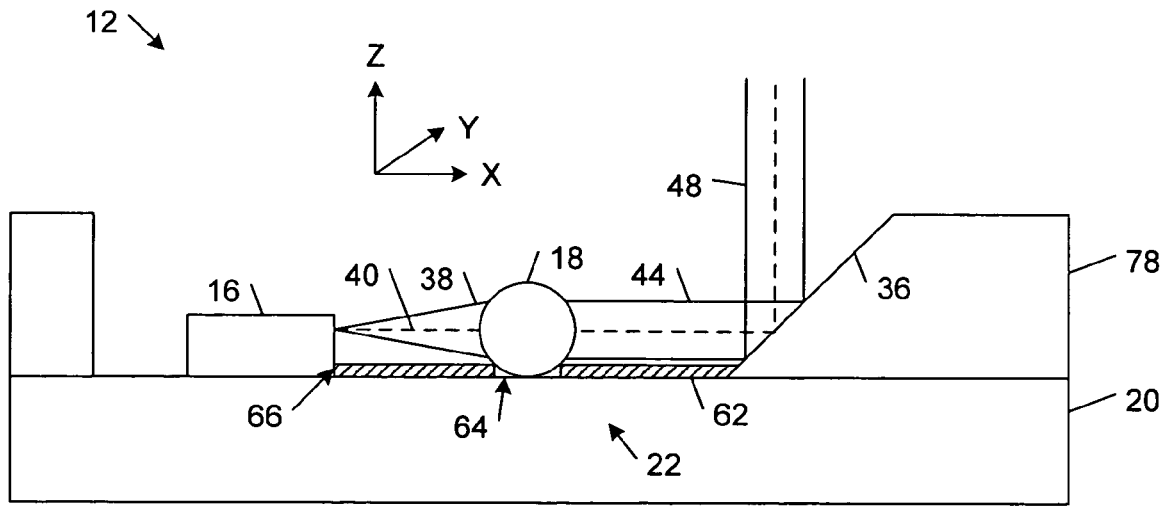
FIG. 4 is a block diagram of an implementation of a laser subassembly of the optoelectronic module shown in FIG. 1.

FIG. 4 shows an implementation of the laser subassembly 12 in which the alignment structure 22 includes a registration layer 62 that defines a positioning cavity 64 and a stop edge 66 abutting the laser light output end of the laser 16. The registration layer 62 may be formed of any type of material that may be deposited onto the surface of substrate 20 using thin film deposition methods and etched using photolithographic processes. In one implementation, the registration layer 62 is a polyimide photoresist layer that is spun onto the surface of the substrate 20, exposed to ultraviolet light through a mask defining the positioning cavity 64 and the stop edge 66, and developed to form the positioning cavity 64 and the stop edge 66 in the undeveloped regions of the registration layer 62.

Figure 5:
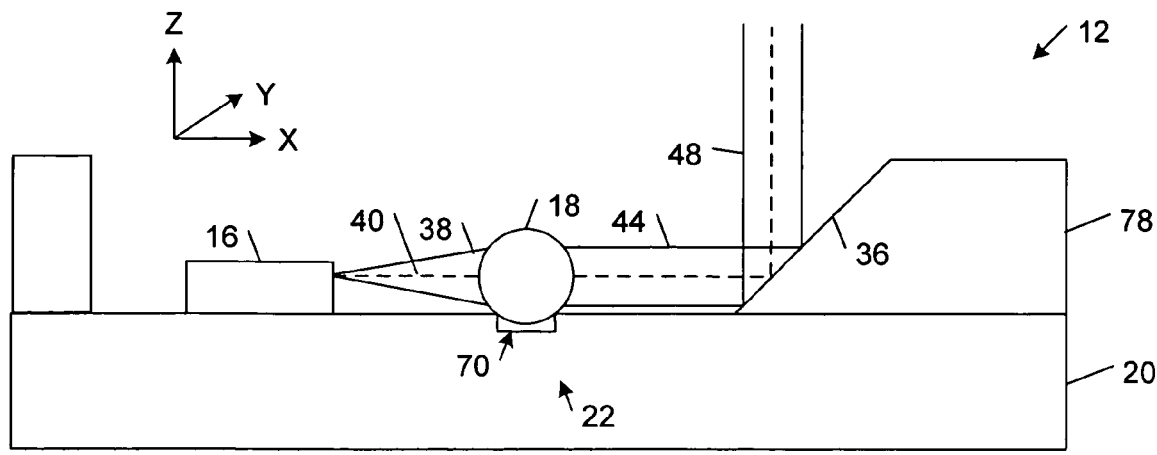
FIG. 5 is a block diagram of another implementation of a laser subassembly of the optoelectronic module shown in FIG. 1.

FIG. 5 shows an implementation of the laser subassembly 12 in which the alignment structure 22 consists of a positioning cavity 70 that is formed in the substrate 20. In one implementation, a photoresist etch mask is deposited on the surface of substrate 20. The etch mask is photolithographically developed to define the opening of the positioning cavity 70. The area of the substrate 20 that is exposed through the etch mask is etched to form the positioning cavity 70. In some implementations, the substrate 70 is etched using an isotropic etch process, such as reactive ion etching, that forms sidewalls that are substantially perpendicular to the surface of the substrate 20. After the positioning cavity 70 has been formed, the etch mask is removed using a solvent.

Each of the positioning cavities 64, 70 has an opening at the top surface of the registration layer 62 that is sized to set the height of the center of the ball lens 18 above the surface of the substrate 20 to coincide with the height of the optical axis 40 so that the ball lens 18 is aligned vertically in a direction (Z) normal to the substrate 20. The openings of the positioning cavities may have any suitable shape, including a regular polygon, such as an equilateral triangle or a square, and a circle. The location of the positioning cavity 64 relative to the location of the laser 16 is designed to align the ball lens 18 in directions (X, Y) in a plane parallel to the surface of the substrate 20. In one exemplary implementation, the center of the ball lens 18 is aligned with the optical axis 40 in a lateral direction (Z) within an alignment tolerance range of ±10 µm, the center of the ball lens 18 is aligned with the optical axis 40 in a lateral direction (Y) in the parallel plane perpendicular to the optical axis 40 within an alignment tolerance range of ±10 µm, and the center of the ball lens 18 is aligned with the optical axis 40 in an axial direction (X) along the optical axis 40 within an alignment tolerance range of ±5 µm. As used herein, the term "axial direction" refers to a direction along the axis of a light beam, and the term "lateral direction" refers to a direction in a plane normal to the axis of a light beam.

Referring back to FIG. 3, after the substrate 20 has been provided (block 60), the laser 16 is mounted to the substrate (block 72). The laser 16 may be an edge-emitting laser, such a Fabry-Perot laser. The laser 16 may be bonded to the surface of substrate 20 using a precision die attachment method. In the implementation shown in FIG. 4, the laser light output end of the laser 16 is positioned against the stop edge 66 of the registration layer 62.

After the laser 16 has been mounted to the substrate 20 (block 72), the ball lens 18 is attached to the alignment structure 22 (block 74). The ball lens 18 may be formed of an optically transparent material (e.g., sapphire or quartz) that has a desired index of refraction. In the implementations shown in FIGS. 4 and 5, the ball lens 18 is positioned within the positioning cavities 64, 70, respectively, and the ball lens 18 is bonded to the substrate 20 using an adhesive, such as an epoxy adhesive. The openings of the positioning cavities 64, 70 have dimensions that are tightly controlled so that the center of the ball lens 18 is aligned with the optical axis 40 of the beam 38 with high accuracy, as explained above.

After the ball lens 18 has been attached to the alignment structure 22 (block 74), the reflector 36 is provided (block 76). The reflector 36 includes a planar reflective surface that deflects the collimated beam 44 into the deflected collimated beam 48. In the illustrated implementations, the reflector 36 is a thin layer of reflective material (e.g., gold) that is deposited on a side wall of an interposer substrate 78 that is coupled between the laser subassembly substrate 20 and the optical substrate 24 of the coupling optics subassembly 14. In other implementations, the reflector 36 may be formed as part of the laser subassembly 12 or as part of the coupling optics subassembly 14. For example, in some implementations, the laser 16, the ball lens 18, and the alignment structure 22 are formed inside a cavity formed in the substrate 20, and the reflector 36 is formed as a part of the laser subassembly 12 by depositing a reflective material (e.g., a layer of gold) on an angled sidewall of the cavity.

In some implementations, the planar reflective surface of the reflector 36 is oriented at an angle of 45° relative to the axis of the collimated beam 44 so that the axis of the deflected collimated beam 48 is perpendicular to the surface of the substrate 20. In other implementations, the planar reflective surface of the reflector 36 is oriented at an angle different from 45° relative to the axis of the collimated beam 44. For example, in one of these implementations, the planar reflective surface of the reflector 36 is oriented at an angle of 49° relative to the axis of the collimated beam 44, in which case the axis of the deflected collimated beam 48 is at an angle of 98° relative to the surface of substrate 20. Tilting the deflected collimated beam 48 at an angle other than 90° relative to the surface of the substrate 20 reduces backreflections that otherwise might adversely affect the performance of the laser 16.

Figures 6A, 6B, 6C:
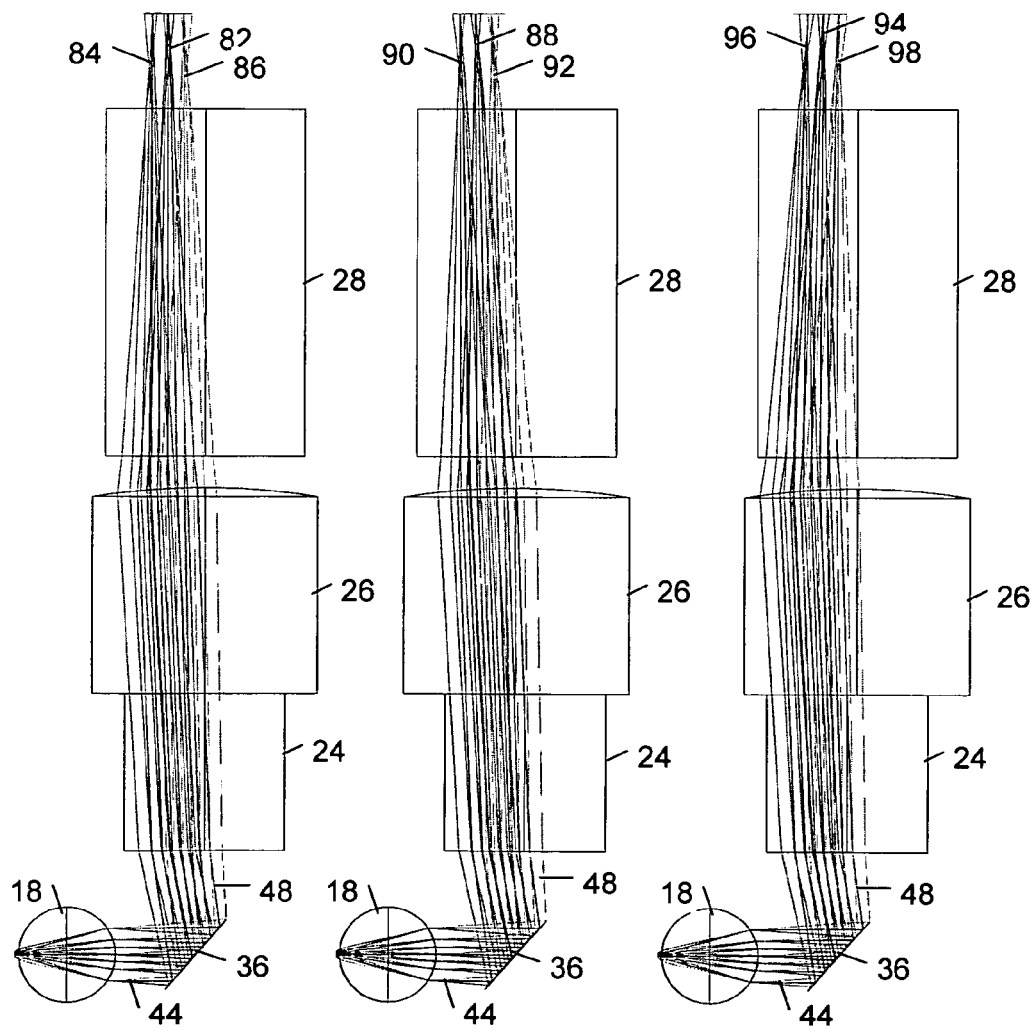
FIGS. 6A–6C are diagrammatic views of the light beam path through the optoelectronic module shown in FIG. 1 with different degrees of axial misalignment between the laser and the ball lens and different degrees of lateral misalignment between the focusing lens and the collimated beam generated by the laser subassembly of the optoelectronic module.

Each of FIGS. 6A–6C shows a respective set of three simulated laser beam paths for different degrees of axial misalignment between the laser 16 and the ball lens 18. The simulated beam paths shown in FIGS. 6A–6C are calculated based on an exemplary implementation of optoelectronic module 10 in which the laser 16 has an aperture with a diameter of 2 µm and a numerical aperture (NA) of 0.5, the ball lens 18 is made of sapphire and has a diameter of 300 µm, the optical substrate 24 has a thickness of 500 µm along the axis of the deflected collimated beam 48, the focusing lens 26 is made of silicon and has a thickness of 650 µm along the axis of the deflected collimated beam 48, and the optical isolator 28 has a thickness of 1100 µm along the axis deflected collimated beam 48. For each of the simulations shown in FIGS. 6A–6C, the reflector 36 is oriented at an angle of 49° relative to the axis of the collimated beam 44 so that the resulting deflected beam 48 is oriented at an angle of 98° relative to the surface of substrate 20.

In FIG. 6A: the simulated beam path 82 corresponds to the case in which the axis of the focusing lens 26 is aligned with the axis of the beam 48 and the output of the laser 16 is located on the focal point of the ball lens 18; the simulated beam path 84 corresponds to the case in which the axis of the focusing lens 26 is aligned with the axis of the beam 48 and the output of the laser 16 is offset from the focal point of the ball lens 18 by +10 µm; and the simulated beam path 86 corresponds to the case in which the axis of the focusing lens 26 is aligned with the axis of the beam 48 and the output of the laser 16 is offset from the focal point of the ball lens 18 by −10 µm.

In FIG. 6B: the simulated beam path 88 corresponds to the case in which the axis of the focusing lens 26 is offset from the axis of the beam 48 by +30 µm and the output of the laser 16 is located on the focal point of the ball lens 18; the simulated beam path 90 corresponds to the case in which the axis of the focusing lens 26 is offset from the axis of the beam 48 by +30 µm and the output of the laser 16 is offset from the focal point of the ball lens 18 by +10 µm; and the simulated beam path 92 corresponds to the case in which the axis of the focusing lens 26 is offset from the axis of the beam 48 by +30 µm and the output of the laser 16 is offset from the focal point of the ball lens 18 by −10 µm.

In FIG. 6C: the simulated beam path 94 corresponds to the case in which the axis of the focusing lens 26 is offset from the axis of the beam 48 by −30 µm and the output of the laser 16 is located on the focal point of the ball lens 18; the simulated beam path 96 corresponds to the case in which the axis of the focusing lens 26 is offset from the axis of the beam 48 by −30 µm and the output of the laser 16 is offset from the focal point of the ball lens 18 by +10 µm; and the simulated beam path 98 corresponds to the case in which the axis of the focusing lens 26 is offset from the axis of the beam 48 by −30 µm and the output of the laser 16 is offset from the focal point of the ball lens 18 by −10 µm.

The simulated coupling efficiencies associated with the various arrangements of components shown in FIGS. 6A–6C are presented in TABLE 1 below.

TABLE 1

|  |  | Focusing Lens 26 - Optical Fiber 34 Misalignment (µm) | | |
| --- | --- | --- | --- | --- |
|  |  | −30 | 0 | +30 |
| Laser 16 - Ball Lens 18 Misalignment (µm) | −10 | −2.22 | −1.91 | −3.16 |
|  | 0 | −2.34 | −1.62 | −2.37 |
|  | 10 | −3.02 | −1.99 | −2.42 |

Based on these simulations, it has been determined that in order to maintain a coupling efficiency drop of 2 dB or less in the exemplary implementation of the optoelectronic module 10 described above, the laser 16 and the ball lens 18 should be aligned within a tolerance range of ±4 µm and the focusing lens 26 and the optical fiber 34 should be aligned within a tolerance range of ±3.5 µm. In addition, these simulations suggest that the back reflected power level is highest (−43 dB) for the case in which the laser 16 and the ball lens 18 are axially misaligned by −10 µm. It is noted that the back reflected power level is −19 dB when the reflector 36 is oriented at an angle of 45° relative to the axis of the collimated beam 44.

Referring back to FIG. 3, after the reflector 36 has been provided (block 76), the focusing lens 26 is provided (block 100). In general, the focusing lens 26 may be any type of lens, including any type of refractive lens and any type of diffractive lens. In the illustrated embodiment, the focusing lens 26 is a refractive micro lens that is bonded to the optical substrate 24 using an adhesive. In other embodiments, the focusing lens 26 is formed lithographically in the optical substrate 24. The optical substrate 24 may be formed of any material that is substantially transparent to the deflected collimated laser light beam 48. In one implementation, the optical substrate 24 is formed of silicon. In another implementation, the optical substrate 24 and the focusing lens 26 are formed of sapphire.

The process of providing the focusing lens 26 (block 80) includes aligning the connector 30 with the deflected collimated beam 48. The connector 30 is bonded to the top surface of the optical substrate 24 over the focusing lens 26. In the illustrated embodiment, the connector 30 includes the optical isolator 28. In other embodiments, the optical isolator 28 may be located at a different location along the laser beam path through the optoelectronic module 10. Some embodiments may not include the optical isolator 28. The collimation of the deflected beam 48 allows the connector 38 to be aligned with the deflected beam 48 by simply adjusting the position of the connector 30 in a plane normal to the top surface of the optical substrate 24 (so-called "passive Z alignment"), thereby reducing the cost and complexity of the optical alignment process.

Collimating the laser light in the laser subassembly 12 also increases the flexibility with which the coupling optics subassembly 14 of the optoelectronic module 10 may be designed. For example, the collimation of the deflected beam 48 allows the thickness of the optical substrate 24 and the axial location of the focusing lens 26 to be optimized separately from the laser subassembly 12.

Figure 7A:
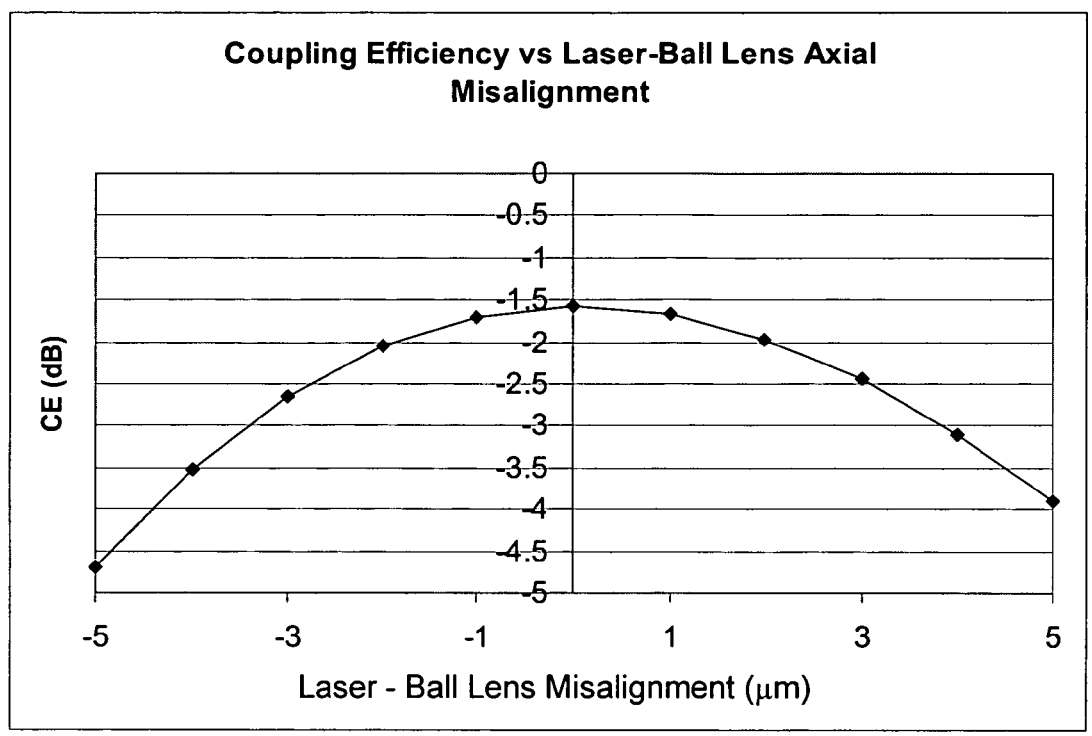
FIG. 7A is a graph of coupling efficiency (CE) plotted as a function of axial misalignment between the laser and the collimating lens in an implementation of the optoelectronic module shown in FIG. 1.
Figure 7B:
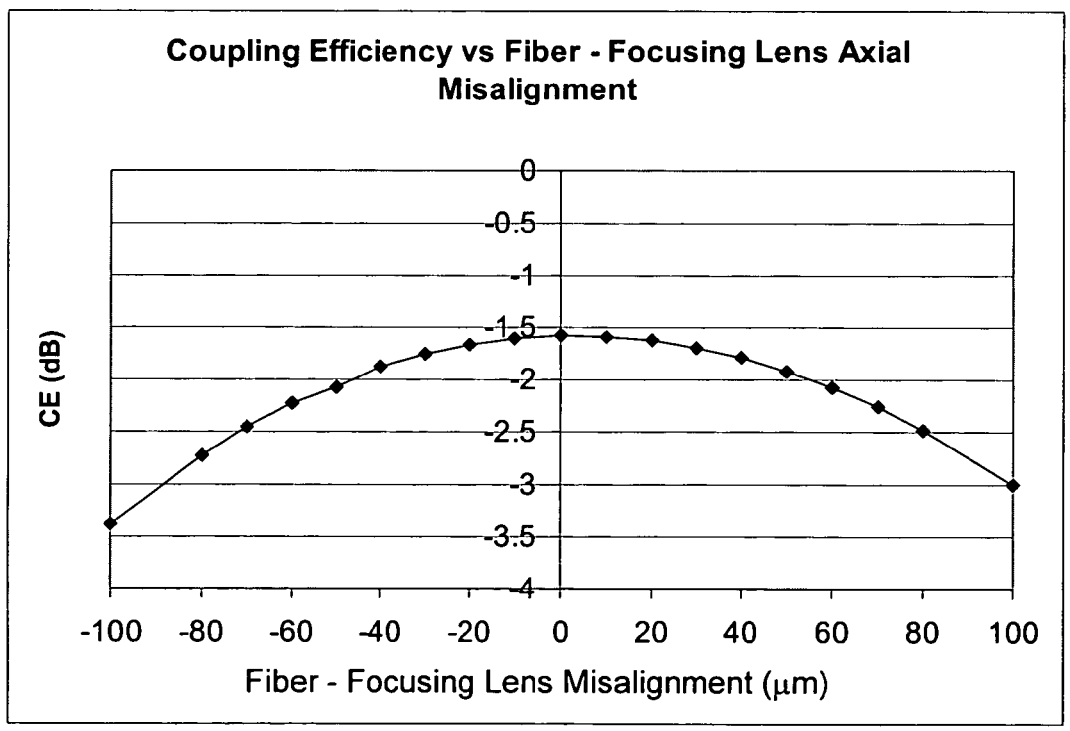
FIG. 7B is a graph of coupling efficiency (CE) plotted as a function of lateral misalignment between an external optical fiber and the focusing lens in an implementation of the optoelectronic module shown in FIG. 1.

In addition, the collimation of the deflected beam 48 relaxes the lateral alignment tolerance constraints for the focusing lens 26, as evidenced by the graphs shown in FIGS. 7A and 7B. These graphs were calculated based on an exemplary implementation of optoelectronic module 10 having a sapphire ball lens 18 with a diameter of 300 μm, an edge-emitting laser 16 with a numerical aperture (NA) of 0.5, a spherical focusing lens 26, and a single mode fiber SFM-28.

FIG. 7A shows a graph of the simulated coupling efficiency for the optoelectronic module 10 plotted as a function of the misalignment between the laser 16 and the ball lens 18 along the axial direction (X) along the optical axis 40 in the plane parallel to the surface of substrate 20. FIG. 7B shows a graph of the simulated coupling efficiency plotted as a function of the lateral misalignment between the optical fiber 34 and the focusing lens 26 along the lateral directions (Y, Z) in the plane normal to the axis of the deflected collimate beam 48. As shown in FIGS. 7A and 7B, the coupling efficiency is much more sensitive to axial misalignment between the laser 16 and the ball lens 18 than it is to the lateral misalignment between the optical fiber 34 and the focusing lens 26. Thus, in some implementations, the center of the ball lens 18 is aligned axially with the optical axis 40 within a first alignment tolerance range and the focusing lens 26 is aligned laterally with the deflected collimated beam 48 within a second alignment tolerance range larger than the first alignment tolerance range.

Other embodiments are within the scope of the claims.

What is claimed is:

1. An optoelectronic module, comprising:
   a laser operable to generate a diverging light beam along an optical axis;
   a ball lens having a center;
   a substrate having a surface supporting the laser and an alignment structure registering the ball lens in a plane parallel to the substrate surface and in a direction normal to the substrate surface so that the center of the ball lens is substantially aligned with the optical axis and the ball lens parallelizes the diverging light beam into a collimated beam, wherein the laser and the ball lens are attached directly to the substrate surface;
   a reflector arranged to deflect the collimated beam to produce a deflected collimated beam in a plane intersecting the substrate surface; and
   a focusing lens arranged to focus the deflected collimated beam.

2. The optoelectronic module of claim 1, wherein the center of the ball lens is aligned with the optical axis within a first alignment tolerance range and the focusing lens is aligned with the deflected collimated beam within a second alignment tolerance range larger than the first alignment tolerance range.

3. The optoelectronic module of claim 2, wherein the center of the ball lens is aligned with the optical axis in the normal direction within an alignment tolerance range of ±10 μm, the center of the ball lens is aligned with the optical axis in a lateral direction in the parallel plane perpendicular to the optical axis within an alignment tolerance range of ±10 μm, and the center of the ball lens is aligned with the laser in an axial direction along the optical axis within an alignment tolerance range of ±5 μm.

4. The optoelectronic module of claim 3, wherein the second alignment tolerance range is ±30 μm.

5. The optoelectronic module of claim 1, wherein the alignment structure comprises a positioning cavity in which the ball lens is partially disposed.

6. The optoelectronic module of claim 5, wherein the positioning cavity has sidewalls substantially normal to the substrate surface.

7. The optoelectronic module of claim 1, wherein the reflector is arranged to produce the collimated beam in a plane intersecting the substrate surface at an angle greater than 90°.

8. The optoelectronic module of claim 1, further comprising a second substrate over the first substrate and supporting the focusing lens.

9. An optoelectronic module, comprising:
   a laser operable to generate a diverging light beam along an optical axis;
   a ball lens having a center;
   a substrate having a surface supporting the laser and an alignment structure registering the ball lens in a plane parallel to the substrate surface and in a direction normal to the substrate surface so that the center of the ball lens is substantially aligned with the optical axis and the ball lens parallelizes the diverging light beam into a collimated beam, wherein the alignment structure comprises a positioning cavity in which the ball lens is partially disposed and the positioning cavity is in the substrate;
   a reflector arranged to deflect the collimated beam to produce a deflected collimated beam in a plane intersecting the substrate surface; and
   a focusing lens arranged to focus the deflected collimated beam.

10. An optoelectronic module, comprising:
    a laser operable to generate a diverging light beam along an optical axis;
    a ball lens having a center;
    a substrate having a surface supporting the laser and an alignment structure registering the ball lens in a plane parallel to the substrate surface and in a direction normal to the substrate surface so that the center of the ball lens is substantially aligned with the optical axis and the ball lens parallelizes the diverging light beam into a collimated beam, wherein the alignment structure comprises a positioning cavity in which the ball lens is partially disposed and the positioning cavity is in a layer of material on the substrate surface;
    a reflector arranged to deflect the collimated beam to produce a deflected collimated beam in a plane intersecting the substrate surface; and
    a focusing lens arranged to focus the deflected collimated beam.

11. The optoelectronic module of claim 10, wherein the layer has a stop edge abutting the laser.

12. A method of making an optoelectronic module, comprising:
    providing a substrate having a surface;
    photolithographically processing the substrate to form an alignment structure supported by the substrate;
    mounting a laser to the substrate in registration with the alignment structure, wherein the laser is operable to generate a diverging light beam along an optical axis;
    attaching a ball lens to the alignment structure so that the ball tens is registered in a plane parallel to the substrate surface and in a direction normal to the substrate surface, wherein the ball lens has a center that is substantially aligned with the optical axis and the ball lens parallelizes the diverging light beam into a collimated beam;

providing a reflector arranged to deflect the collimated beam to produce a deflected collimated beam in a plane intersecting the substrate surface; and providing a focusing lens arranged to focus the deflected collimated beam.

13. The method of claim 12, wherein the attaching comprises aligning the center of the ball lens with the optical axis within a first alignment tolerance range and the providing of the focusing lens comprises aligning the focusing lens with the deflected collimated beam within a second alignment tolerance range larger than the first alignment tolerance range.

14. The method of claim 13, wherein the center of the ball lens is aligned with the optical axis in the normal direction within an alignment tolerance range of ±10 µm, the center of the ball lens is aligned with the optical axis in a lateral direction in the parallel plane perpendicular to the optical axis within an alignment tolerance range of ±10 µm, and the center of the ball lens is aligned with the laser in an axial direction along the optical axis within an alignment tolerance range of ±5 µm.

15. The method of claim 14, wherein the second alignment tolerance range is ±30 µm.

16. The method of claim 12, wherein the providing of the reflector comprises arranging the reflector to produce the collimated beam in a plane intersecting the substrate surface at an angle greater than 90°.

17. The method of claim 12, further comprising providing over the first substrate a second substrate supporting the focusing lens.

18. The method of claim 12, wherein the mounting comprises attaching the laser directly to the substrate surface and the attaching comprises attaching the ball lens directly to the substrate surface.

19. A method of making an optoelectronic module, comprising:

providing a substrate having a surface supporting an alignment structure, wherein providing the substrate comprises forming in the substrate a positioning cavity having sidewalls substantially normal to the substrate surface;

mounting to the substrate a laser operable to generate a diverging light beam along an optical axis;

attaching a ball lens having a center to the alignment structure, which registers the ball lens in a plane parallel to the substrate surface and in a direction normal to the substrate surface so that the center of the ball lens is substantially aligned with the optical axis and the ball lens parallelizes the diverging light beam into a collimated beam;

providing a reflector arranged to deflect the collimated beam to produce a deflected collimated beam in a plane intersecting the substrate surface; and providing a focusing lens arranged to focus the deflected collimated beam.

20. A method of making an optoelectronic module, comprising:

providing a substrate having a surface supporting an alignment structure, wherein providing the substrate comprises forming a layer of material on the substrate and etching a positioning cavity in the layer of material;

mounting to the substrate a laser operable to generate a diverging light beam along an optical axis;

attaching a ball lens having a center to the alignment structure, which registers the ball lens in a plane parallel to the substrate surface and in a direction normal to the substrate surface so that the center of the ball lens is substantially aligned with the optical axis and the ball lens parallelizes the diverging light beam into a collimated beam;

providing a reflector arranged to deflect the collimated beam to produce a deflected collimated beam in a plane intersecting the substrate surface; and providing a focusing lens arranged to focus the deflected collimated beam.

* * * * *

UNITED STATES PATENT AND TRADEMARK OFFICE
CERTIFICATE OF CORRECTION

| | |
|---|---|
| PATENT NO. | : 7,213,982 B2 |
| APPLICATION NO. | : 10/960125 |
| DATED | : May 8, 2007 |
| INVENTOR(S) | : Ye Chen |

It is certified that error appears in the above-identified patent and that said Letters Patent is hereby corrected as shown below:

Col. 2 Line 1 Delete "Aperature" and insert -- Aperture --, therefor.

Col. 8 Line 65 In Claim 12, delete "tens" and insert -- lens --, therefor.

Signed and Sealed this

Twenty-third Day of December, 2008

JON W. DUDAS
*Director of the United States Patent and Trademark Office*